(12) United States Patent
Komatsu et al.

(10) Patent No.: US 11,962,238 B2
(45) Date of Patent: Apr. 16, 2024

(54) ELECTRONIC CONTROL UNIT

(71) Applicant: Hitachi Astemo, Ltd., Hitachinaka (JP)

(72) Inventors: Shigenobu Komatsu, Hitachinaka (JP); Hideyuki Sakamoto, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 245 days.

(21) Appl. No.: 17/636,633

(22) PCT Filed: Aug. 14, 2020

(86) PCT No.: PCT/JP2020/030843
§ 371 (c)(1),
(2) Date: Feb. 18, 2022

(87) PCT Pub. No.: WO2021/039433
PCT Pub. Date: Mar. 4, 2021

(65) Prior Publication Data
US 2022/0345038 A1 Oct. 27, 2022

(30) Foreign Application Priority Data
Aug. 29, 2019 (JP) .................................. 2019-156631

(51) Int. Cl.
*H02M 1/32* (2007.01)
*B60L 50/60* (2019.01)
(Continued)

(52) U.S. Cl.
CPC ............. *H02M 3/157* (2013.01); *B60L 50/60* (2019.02); *H02M 1/0003* (2021.05);
(Continued)

(58) Field of Classification Search
CPC ............. H02M 1/0016; H02M 1/0003; H02M 1/0025; H02M 1/007; H02M 1/32;
(Continued)

(56) References Cited

U.S. PATENT DOCUMENTS

| 2017/0207699 A1* | 7/2017 | Nakata ..................... H02M 1/32 |
| 2020/0099306 A1* | 3/2020 | Kanbara ............. H02M 3/1588 |
| 2023/0252926 A1* | 8/2023 | Hong ...................... H02M 1/32 345/211 |

FOREIGN PATENT DOCUMENTS

| JP | 2007-104846 A | 4/2007 |
| JP | 2012-235565 A | 11/2012 |

(Continued)

OTHER PUBLICATIONS

International Search Report with English translation and Written Opinion issued in corresponding application No. PCT/JP2020/030843 dated Nov. 2, 2020.

*Primary Examiner* — Kyle J Moody
*Assistant Examiner* — Jye-June Lee
(74) *Attorney, Agent, or Firm* — Foley & Lardner LLP (57) ABSTRACT

Provided is a highly reliable electronic control unit capable of improving responsiveness of an output current of a switching power supply to load current variation and suppressing power supply voltage variation accompanying the load current variation at low cost and with high power efficiency. Provided are: a calculation unit that performs signal processing; a first power supply circuit that supplies a first power supply voltage to the calculation unit; and a second power supply circuit that supplies a second power supply voltage to the first power supply circuit. The calculation unit has a function of outputting a control signal when a change in a consumed current of the calculation unit exceeds a predetermined threshold, and changes any one or both of a control scheme of the first power supply circuit and the second power supply voltage according to the control signal.

7 Claims, 8 Drawing Sheets

(51) Int. Cl.
*H02M 1/00* (2006.01)
*H02M 1/08* (2006.01)
*H02M 3/157* (2006.01)

(52) U.S. Cl.
CPC ....... *H02M 1/0016* (2021.05); *H02M 1/0025* (2021.05); *H02M 1/0038* (2021.05); *H02M 1/007* (2021.05); *H02M 1/08* (2013.01); *H02M 1/32* (2013.01); *B60L 2240/527* (2013.01)

(58) Field of Classification Search
CPC . H02M 3/157; H02M 3/158; B60L 2240/527; B60L 2240/529; B60L 2210/12; B60L 2250/10; B60L 3/003; B60L 15/007
See application file for complete search history.

(56) References Cited

FOREIGN PATENT DOCUMENTS

| | | |
|---|---|---|
| JP | 2017-077103 A | 4/2017 |
| JP | 2018-174632 A | 11/2018 |

* cited by examiner

ELECTRONIC CONTROL UNIT

TECHNICAL FIELD

The present invention relates to a configuration of an electronic control unit (ECU) and control thereof, and more particularly to a technique effective when being applied to an automatic driving ECU that is required to have high reliability and responsiveness.

BACKGROUND ART

With advancement of an automatic driving level of an automobile, an automatic driving electronic control unit (ECU) is required to have higher processing capability and is equipped with a system on a chip (SoC) or a field-programmable gate array (FPGA) having higher performance.

A consumed current also increases in the high-performance SoC or FPGA. With the increase in the consumed current, a change amount of the consumed current (a change amount of a load current when viewed from a power supply device) also increases so that a variation of a power supply voltage increases.

On the other hand, semiconductor elements such as the high-performance SoC or FPGA are manufactured by a finer semiconductor process, an operating voltage decreases, and a power supply voltage range that enables a normal operation decreases.

Therefore, the automatic driving ECU equipped with these semiconductor elements is required to reduce the variation of the power supply voltage with respect to a larger load current change.

CITATION LIST

Patent Literature

PTL 1: JP 2007-104846 A

SUMMARY OF INVENTION

Technical Problem

As a general method for suppressing a variation of an output voltage of a power supply device (switching power supply) with respect to a load current change, a capacitance of a capacitor connected to a power supply is increased, but the cost increases as the load current variation increases.

As a method other than the increase of the capacitance of the capacitor, responsiveness of an output current of the power supply device is increased, and followability of the output current of the power supply device with respect to the change of the load current is increased, whereby a variation of the power supply voltage can be suppressed.

One of methods for increasing the responsiveness of the output current is to increase a switching frequency. When the switching frequency is increased, it is possible to reduce an inductor value while suppressing a ripple voltage. When the inductor value is reduced, a change speed of an inductor current increases, and the output current responsiveness is improved.

However, the increase in the switching frequency degrades power efficiency.

As a background art in this technical field, for example, there is a technique such as PTL 1. PTL 1 describes a method of increasing a change speed of an inductor current by increasing a voltage applied to an inductor, but a negative voltage is required in addition to a plurality of positive voltages, so that the cost for generating each voltage increases.

Therefore, an object of the present invention is to provide a highly reliable electronic control unit capable of improving the responsiveness of an output current of a switching power supply with respect to a load current variation and suppressing a power supply voltage variation accompanying the load current variation at low cost and high power efficiency, and a control method thereof.

Solution to Problem

In order to solve the above problems, the present invention includes a calculation unit that performs signal processing, a first power supply circuit that supplies a first power supply voltage to the calculation unit, and a second power supply circuit that supplies a second power supply voltage to the first power supply circuit, the calculation unit having a function of outputting a control signal when a change amount of a consumed current of the calculation unit is expected to exceed a predetermined threshold and changing any voltage value of the first power supply voltage and the second power supply voltage according to the control signal.

Advantageous Effects of Invention

According to the present invention, it is possible to realize the highly reliable electronic control unit capable of improving the responsiveness of the output current of the switching power supply with respect to the load current variation and suppressing the power supply voltage variation accompanying the load current variation at low cost and high power efficiency, and the control method thereof.

Other objects, configurations, and effects which have not been described above become apparent from embodiments to be described hereinafter.

DESCRIPTION OF EMBODIMENTS

Hereinafter, embodiments of the present invention will be described with reference to the drawings. Incidentally, the same configurations in the respective drawings will be denoted by the same reference signs, and detailed descriptions of the overlapping parts will be omitted.

First Embodiment

Figure 1:
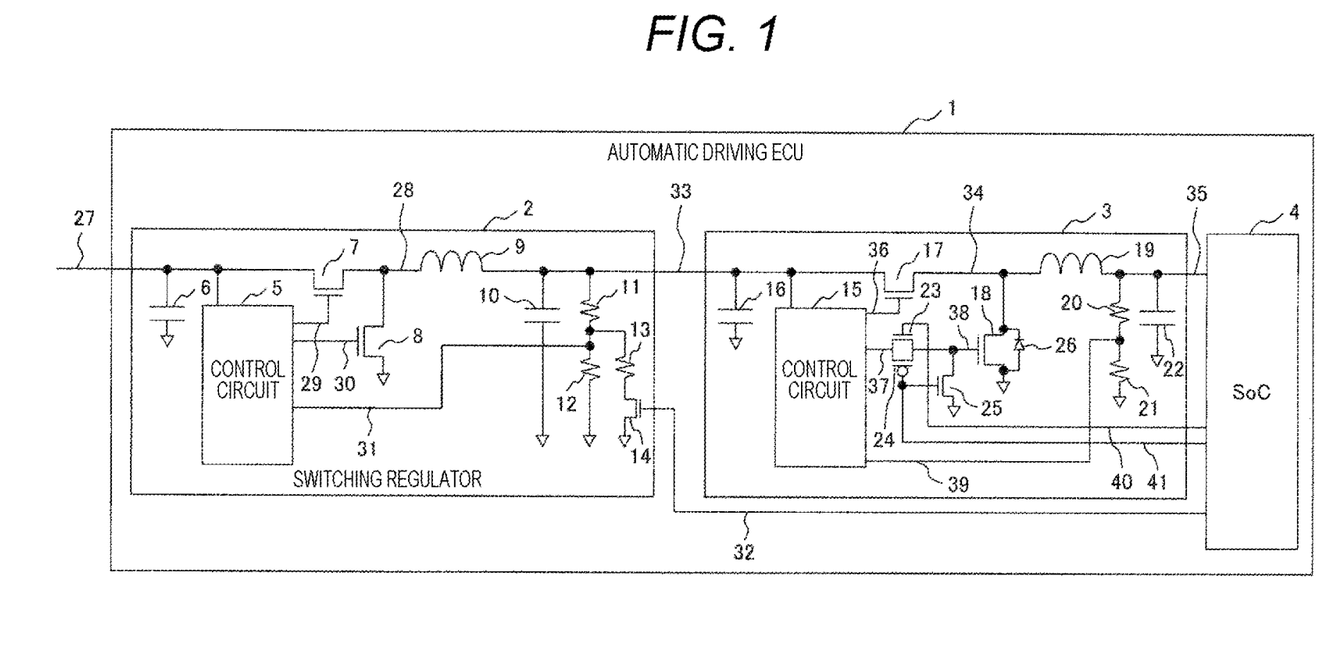
FIG. 1 is a block diagram illustrating a schematic configuration of an automatic driving ECU of a first embodiment.

An electronic control unit of a first embodiment of the present invention and a control method thereof will be described with reference to FIGS. 1 to 4. FIG. 1 is a block diagram illustrating a schematic configuration of an automatic driving ECU of the present embodiment. As illustrated in FIG. 1, an automatic driving ECU 1 according to the present embodiment includes: an SoC 4 which is a calculation unit that performs signal processing; a first-stage step-down switching power supply (switching regulator) 2 that converts a battery voltage supplied through a power supply line 27 into a lower voltage; and a second-stage step-down switching power supply 3 that further converts an output voltage of the first-stage step-down switching power supply 2 supplied through a power supply line 33 into a lower voltage and supplies a power supply voltage to the SoC 4 through a power supply output 35.

The first-stage step-down switching power supply (switching regulator) 2 includes power switches 7 and 8, a power supply control circuit 5 that controls on and off times of the power switches 7 and 8, an input voltage stabilizing capacitor (capacitor) 6, an inductor 9, and an output voltage stabilizing capacitor (capacitor) 10, output voltage dividing resistors 11 and 12, a resistor 13 for changing an output voltage dividing resistance ratio, and a switch 14 for switching an output voltage dividing resistance ratio such that a power supply output voltage to the power supply line 33 becomes constant.

The switch 14 for switching an output voltage dividing resistance ratio is switched between on and off by a control signal 32 from the SoC 4. The power supply control circuit 5 controls the power switches 7 and 8 such that a voltage of a feedback signal 31 becomes constant. The voltage of the feedback signal 31 is determined by the voltage division of the power supply line 33 performed by the resistors 11, 12, and 13. An output voltage of the power supply line 33 can be changed by changing a voltage division ratio by the switch 14. Specifically, when the switch 14 is turned on, the voltage of the power supply line 33 can be made higher than that when the switch 14 is turned off.

The second-stage step-down switching power supply 3 includes power switches 17 and 18, a power supply control circuit 15 that controls on and off times of the power switches 17 and 18, an input voltage stabilizing capacitor (capacitor) 16, an inductor 19, an output voltage stabilizing capacitor (capacitor) 22, output voltage dividing resistors 20 and 21, and switches 23, 24, and 25 for controlling a gate voltage of the power switch 18 such that a power supply output voltage to the power supply output 35 becomes constant. Incidentally, a diode 26 explicitly indicates a parasitic body diode of the power switch 18.

The switches 23, 24, and 25 are turned on and off by control signals 40 and 41 from the SoC 4. When the control signal 40 is high and the control signal 41 is low, the switches 23 and 24 are turned on and the switch 25 is turned off, an output signal 37 of the power supply control circuit 15 is transmitted to a gate signal 38 of the power switch 18, and on and off is controlled by the power supply control circuit 15.

When the control signal 40 is low and the control signal 41 is high, the switches 23 and 24 are turned off and the switch 25 is turned on, and the gate signal 38 of the power switch 18 is separated from the output signal 37 of the power supply control circuit 15 and fixed to low. As a result, the power switch 18 is controlled to an off state regardless of the output signal 37 of the power supply control circuit 15. When the power switch 18 is turned off, the diode 26 causes a current to flow instead of the power switch 18, and serves as a power supply of a so-called asynchronous operation.

Figure 2:
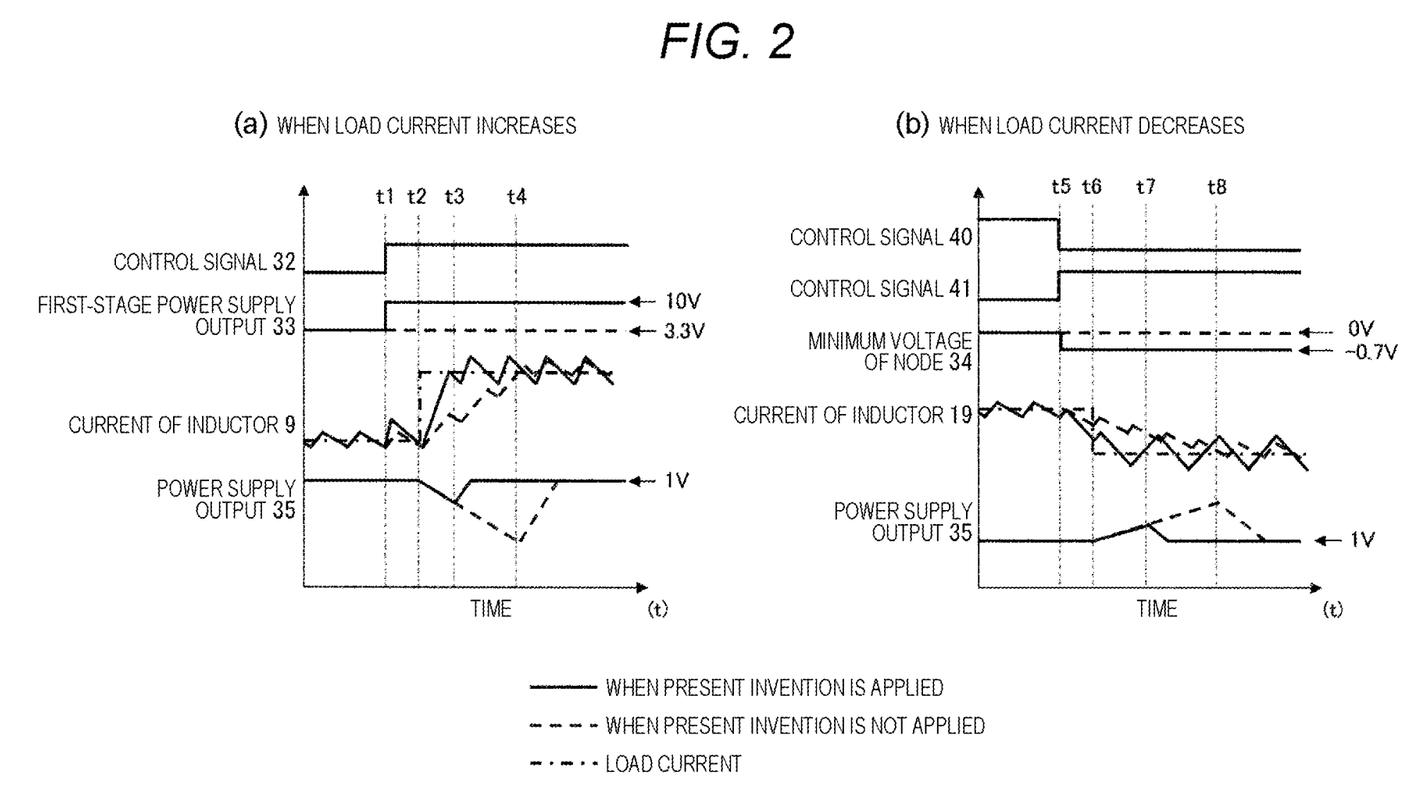
FIG. 2 is an operation waveform diagram of the automatic driving ECU of the first embodiment.

An operation and an effect of the automatic driving ECU 1 of the present embodiment are illustrated in FIG. 2. FIG. 2(a) illustrates an operation and an effect of the SoC 4 when the load current increases, and FIG. 2(b) illustrates an operation and an effect of the SoC 4 when the load current decreases.

First, in FIG. 2(a), in a case where the SoC 4 predicts that the consumed current of the SoC 4 itself changes in the next processing, an increase amount of the load current is larger than a specified value, and the power supply voltage is likely to decrease below an operation guarantee range of the SoC 4, the control signal 32 is changed from low to high at time t1 before the load current changes to increase the voltage of the first-stage power supply output 33 of the first-stage step-down switching power supply 2. (3.3 V→10 V)

Since the voltage of the first-stage power supply output 33 of the first-stage step-down switching power supply 2 is increased, the voltage applied to the inductor 19 increases, and an increase in an inductor current of the inductor 19 when the power switch 17 is turned on is accelerated.

As a result, the current of the inductor 9 (solid line in FIG. 2(a): when the present invention is applied) rises sharply after the load current increases at time t2, and reaches the same current amount as the load current (dashed-dotted line in FIG. 2(a): load current) at time t3. On the other hand, when the first-stage power supply output 33 is not increased (dotted line in FIG. 2 (a): when the present invention is not applied), it takes time until t4 to increase the current of the inductor 9 to a load current amount (dashed-dotted line in FIG. 2(a): load current), and the voltage drop of the power supply output 35 also increases.

Incidentally, after the change of the load current ends, the control signal 32 is changed to low to decrease the voltage of the first-stage power supply output 33 (from 10 V to 3.3 V) although not illustrated in FIG. 2(a). Thus, deterioration of power efficiency can be prevented.

Next, in FIG. 2(b), in a case where the SoC 4 predicts that the consumed current of the SoC 4 itself changes in the next processing, a decrease amount of the load current is larger than a specified value, and the power supply voltage is likely to rise above the operation guarantee range of the SoC 4, the SoC 4 changes the control signal 40 from high to low and changes the control signal 41 from low to high at time t5, thereby turning off the power switch 18.

Since the power switch 18 is turned off, the inductor current is supplied through the diode 26 when the power switch 17 is turned off. A node 34 is lower than a GND voltage by a forward bias voltage of the diode 26, and a larger negative voltage is applied as compared with a case where the power switch 18 is turned on, and thus, a decrease rate of the current of the inductor 19 increases.

When the load current (dashed-dotted line in FIG. 2(b): load current) decreases at time t6, the current of the inductor 19 (solid line in FIG. 2(b): when the present invention is applied) decreases to a load current amount (dashed-dotted line in FIG. 2(b): load current) at time t7 by turning off the power switch 18, so that it is possible to suppress an increase in the power supply output 35. On the other hand, when the power switch 18 is not controlled to the off state, the current of the inductor 19 does not decrease to the load current until time t8, and the voltage rise of the power supply output 35 increases.

Incidentally, after the change of the load current ends, the control signal 40 is returned to high, and the control signal 41 is returned to low to perform a synchronous operation although not illustrated in FIG. 2(b). Since the asynchronous operation is limited to a short time when the load current greatly decreases, the deterioration of the power efficiency can be prevented.

Figure 3:
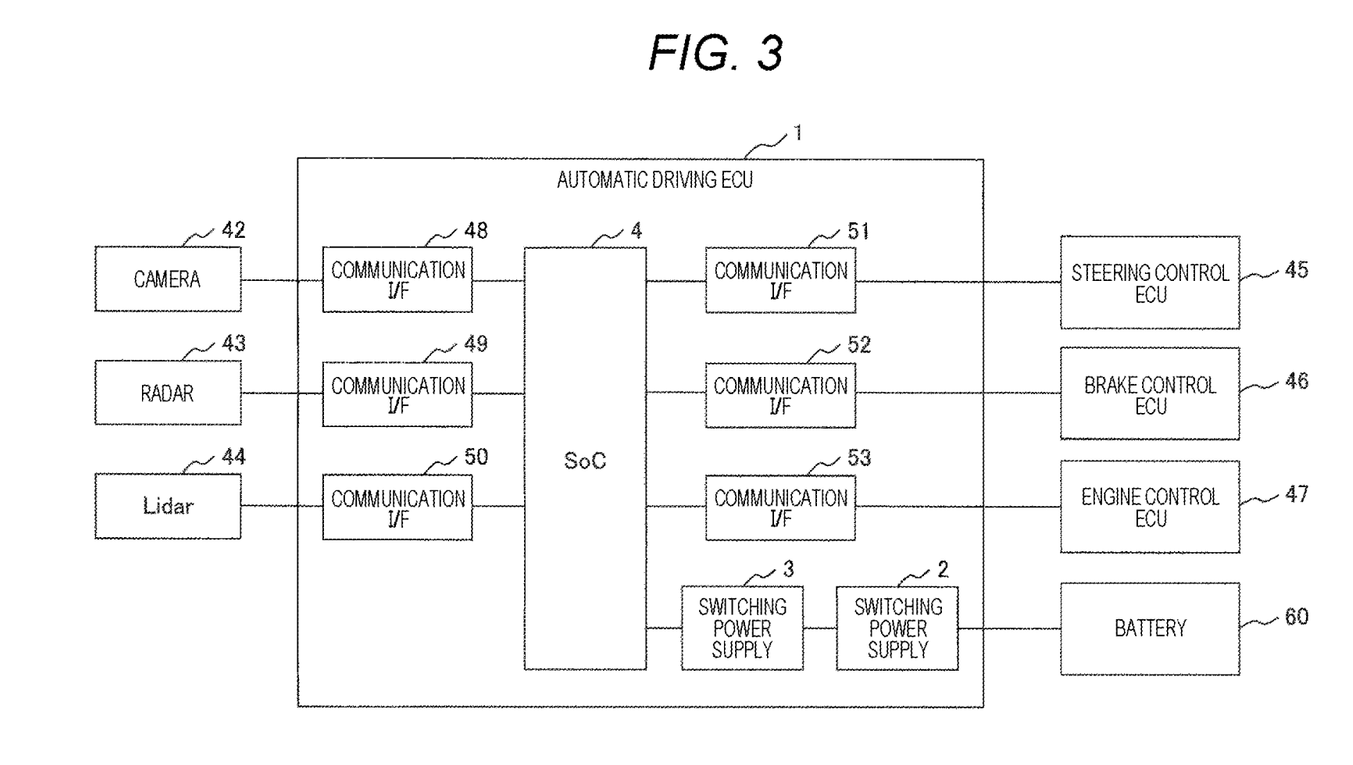
FIG. 3 is a block diagram illustrating a schematic configuration of the automatic driving ECU and peripheral devices of the first embodiment.

A relationship between the operation of the automatic driving ECU 1 and the control signals 32, 40, and 41 will be described with reference to FIGS. 3 and 4. FIG. 3 is a block diagram illustrating a schematic configuration of the automatic driving ECU 1 and peripheral devices (peripheral circuits).

The SoC 4 mounted on the automatic driving ECU 1 receives output signals of external recognition sensors, such as a camera 42, a radar 43, and a light detection and ranging (Lidar) 44, through communication I/Fs 48, 49, and 50, and performs external recognition for recognizing what kind of object is present at which position in the external environment. A behavior of a three-dimensional object in the external environment is predicted from a position, a shape, and a temporal change of the object in the external environment, a trajectory is generated to determine how a vehicle operates from results of the external recognition and the behavior prediction of the three-dimensional object, a control signal for realizing an operation along the trajectory is generated, and the control signal is transmitted to a steering control ECU 45, a brake control ECU 46, and an engine control ECU 47 through the communication I/Fs 51, 52, and 53.

Figure 4:
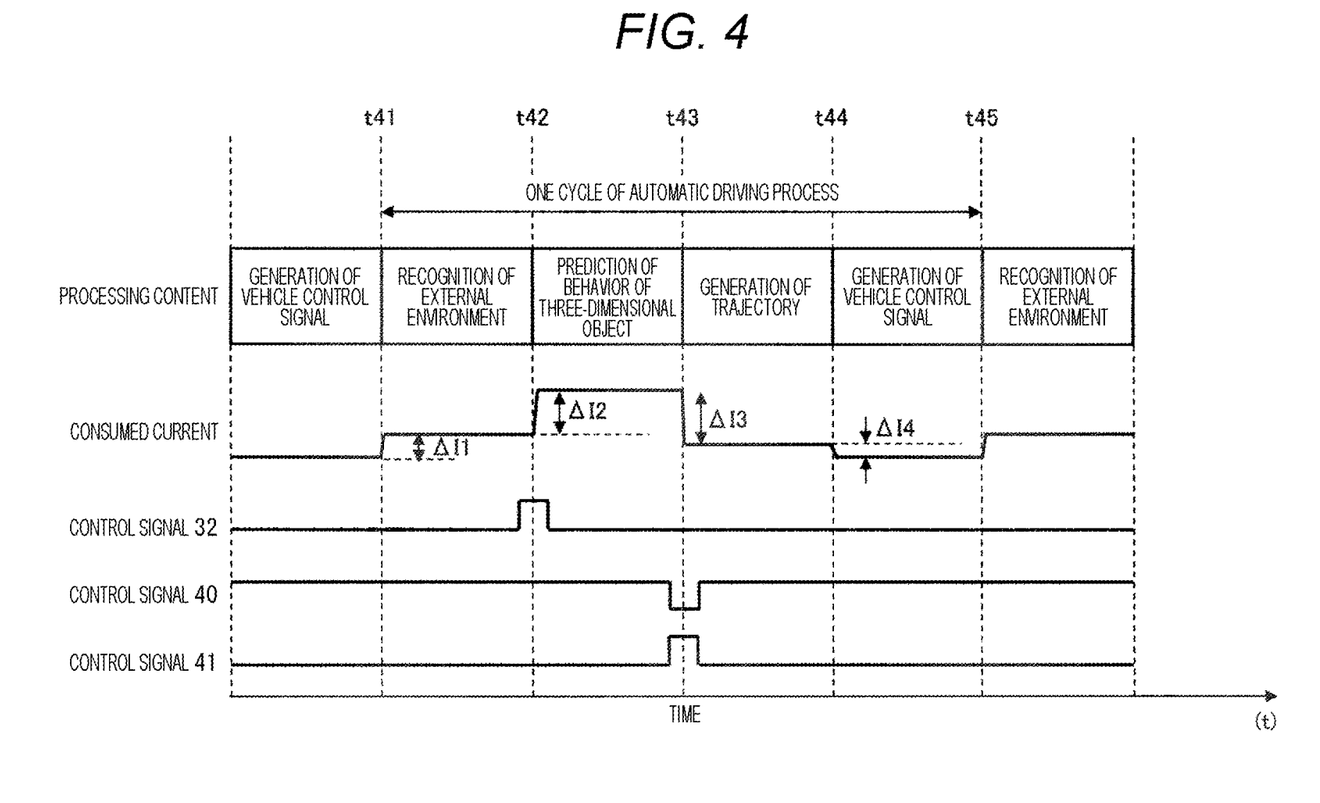
FIG. 4 is a timing chart illustrating a relationship among a processing content, a consumed current, and a power supply control signal operation of the automatic driving ECU of the first embodiment.

FIG. 4 illustrates a processing content of the automatic driving ECU 1, a change in a consumed current due to a change in processing, and states of the control signals 32, 40, and 41 for controlling the switching power supplies 2 and 3. As described above, the automatic driving ECU 1 sequentially repeats each processing of the external recognition, the three-dimensional object behavior prediction, the trajectory generation, and the vehicle control signal generation.

Since the SoC 4 operates so as to minimize the power consumption by changing the number of CPU cores used for calculation or changing a clock frequency according to a processing content of each processing, the power consumption also greatly changes according to a processing amount of each processing. Then, the SoC 4 predicts the change in the consumed current in each processing in advance, and controls the control signals 32, 40, and 41 for controlling the switching power supplies 2 and 3.

For example, in a case where a consumed current increase amount ΔI1 is smaller than a specified value when the processing is switched from the vehicle control signal generation to the external recognition at time t41, the normal operation is performed without changing the control signals 32, 40, and 41. On the other hand, when the processing is switched from the external recognition to the three-dimensional object behavior prediction at time t42, a consumed current increase amount ΔI2 is predicted to be larger than the specified value. Thus, a current increase speed of the inductor 19 is increased to suppress the decrease in the power supply voltage of the SoC 4 by controlling the control signal 32 to a high state in advance and increasing the output voltage (first-stage power supply output 33) of the first-stage step-down switching power supply 2.

Further, when the processing content is switched from the three-dimensional object behavior prediction to the trajectory generation at time t43, a consumed current decrease amount ΔI3 is expected to be larger than a specified value. Thus, the operation of the second-stage step-down switching power supply 3 is set to the asynchronous operation by controlling the control signal 40 to low and controlling the control signal 41 to high in advance, and a current decrease speed of the inductor 19 is increased, so that the increase in the power supply voltage of the SoC 4 is suppressed.

Incidentally, the control at the time of switching the processing content has been described as an example in the above description of FIG. 4, but the processing content of the three-dimensional object behavior prediction, for example, can be further subdivided to perform control. Further, it is expected that a calculation amount of the three-dimensional object behavior prediction also changes depending on the number of three-dimensional objects in the external environment, and thus, it is also possible to switch the control depending on a change in such an external factor even for the same processing.

As described above, the electronic control unit (automatic driving ECU 1) according to the present embodiment includes: the calculation unit (the SoC 4) that performs signal processing; a first power supply circuit (the second-stage step-down switching power supply 3) that supplies a first power supply voltage (the power supply output 35) to the calculation unit (SoC 4); and a second power supply circuit (the first-stage step-down switching power supply 2) that supplies a second power supply voltage (the first-stage power supply output 33) to the first power supply circuit (the second-stage step-down switching power supply 3). The calculation unit (SoC 4) has a function of predicting a change amount of a consumed current of the calculation unit (SoC 4) and outputting the control signals 32, 40, and 41 when a change in the consumed current is expected to exceed a predetermined threshold, and changes a control scheme of the first power supply circuit or a voltage value of the second power supply voltage (first-stage power supply output 33) according to the control signals 32, 40, and 41.

Further, the second power supply circuit (first-stage step-down switching power supply 2) has a function of changing a voltage value of the second power supply voltage (first-stage power supply output 33) according to the control signal 32. When the change in the consumed current of the calculation unit (SoC 4) is expected to exceed the predetermined threshold, the calculation unit (SoC 4) increases the voltage value of the second power supply voltage (first-stage power supply output 33).

Further, the first power supply circuit (the second-stage step-down switching power supply 3) is a step-down switching power supply circuit that includes: the inductor 19; a high-side switch (the power switch 18) that switches ON and OFF between the inductor 19 and an input power supply (the first-stage power supply output 33); a low-side switch (the switch 25) that switches ON and OFF between an input of the inductor 19 and a GND; and the control circuit 15 that controls ON and OFF of each of the high-side switch (power switch 18) and the low-side switch (switch 25), has a function of constantly controlling the low-side switch (switch 25) to an OFF state according to the control signals 10 and 41, and constantly controls the low-side switch (switch 25) to the OFF state when being notified that the change in the consumed current of the calculation unit (SoC 4) exceeds the predetermined threshold according to the control signal.

Further, the calculation unit (SoC 4) performs calculation for grasping an object around a vehicle and controlling the vehicle based on information of an external recognition sensor, predicts a change in a calculation amount caused by a difference in a type of calculation or a driving condition, and outputs a control signal to the outside when the change in the consumed current due to the change in the calculation amount exceeds a predetermined threshold.

When the present invention is applied as described above, it is possible to suppress a power supply voltage variation caused by a load current change at low cost by suppressing an additional circuit. Further, the deterioration of the power efficiency can also be suppressed.

As a result, it is possible to contribute to advanced driving assistance and automatic driving of a vehicle that require high reliability and responsiveness.

Second Embodiment

An electronic control unit of a second embodiment of the present invention and a control method thereof will be described with reference to FIG. 5.

Figure 5:
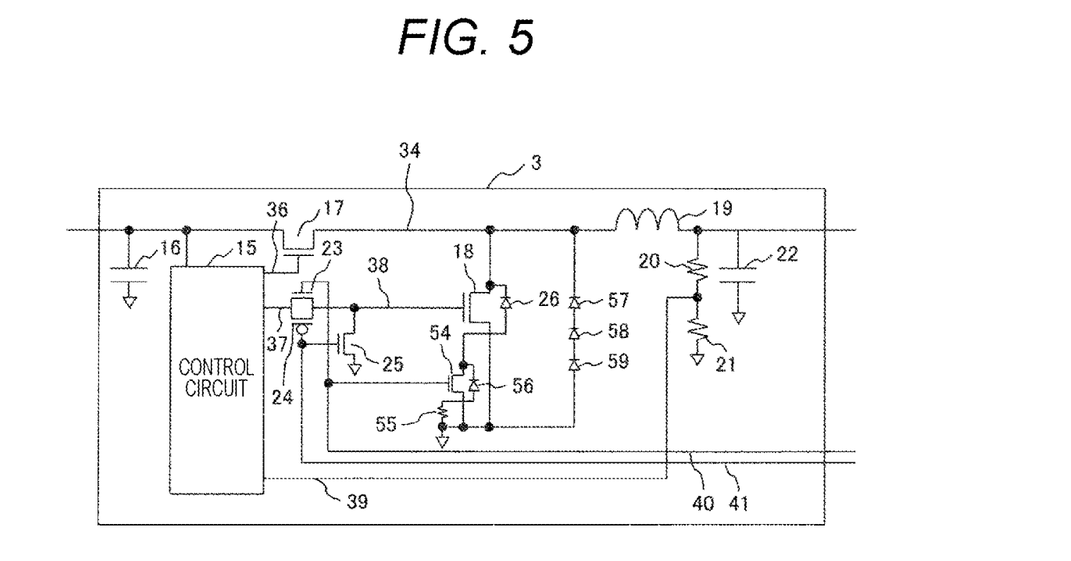
FIG. 5 is a diagram illustrating a schematic configuration of a switching power supply of a second embodiment.

FIG. 5 is a diagram illustrating a schematic configuration of a second-stage step-down switching power supply 3 of the present embodiment. The electronic control unit of the present embodiment is different from the electronic control unit of the first embodiment in terms of a configuration of the second-stage step-down switching power supply 3. The other configurations are the same as those of the first embodiment.

As illustrated in FIG. 5, the second-stage step-down switching power supply 3 of the present embodiment is different from the second-stage step-down switching power supply 3 of the first embodiment in that an NMOS 54, a parasitic diode 56 of the NMOS 54, a resistor 55 for limiting a current, and diodes 57, 58, and 59 are added.

The NMOS 54 is arranged between substrate power feeding of a power switch (NMOS) 18 and a GND, and ON and OFF of the NMOS 54 is controlled by a control signal 40.

The resistor 55 for limiting a current is arranged between a substrate of the NMOS 54 and the GND, and limits the current flowing through the parasitic diode 56.

The control of the control signals 40 and 41 is the same as that in the first embodiment. When it is predicted that a load current greatly decreases, the control signal 40 is controlled to a low level, and the control signal 41 is controlled to a high level. As a result, the current is supplied from the GND through the diode 26 in the first embodiment in which the power switch 18 is turned off. In the present embodiment, however, the NMOS 54 is also turned off, and the current flowing through the parasitic diode 56 is also limited by the resistor 55 so that the current does not flow through the diode 26, but the current is supplied through the diodes 57, 58, and 59.

As a result, a voltage of a node 34 can be set to be lower than that in the first embodiment, and a current decrease speed of an inductor 19 can be increased. For example, when a forward bias voltage of the diode 26 is 0.7 V, the voltage of the node 34 is about −0.7 V in the first embodiment, but can be reduced to about −2.1 V in the present embodiment.

As described above, in the second-stage step-down switching power supply 3 of the present embodiment, a low-side switch is the NMOS 54, and a switch arranged between a substrate terminal of the low-side switch and the GND, and the plurality of diodes 57, 58, and 59 connected in series between the node 34 connecting a high-side switch (the power switch 18) and the inductor 19, and the GND are provided. If the low-side switch (NMOS 54) is controlled to an OFF state, the switch is also controlled to the OFF state simultaneously, so that the substrate terminal of the low-side switch (NMOS 54) and the GND are brought into a disconnected state, and the current flowing through the inductor 19 is supplied from the GND through the plurality of diodes 57, 58, and 59 when the high-side switch (power switch 18) is in the OFF state.

Incidentally, the diodes 57, 58, and 59 are connected in series in three stages in the present embodiment, but the number of diodes is not limited to three. For example, a case where diodes are configured in two stages can be realized by removing the resistor 55 for limiting a current and directly connecting the substrate power feeding of the NMOS 54 to the GND.

Third Embodiment

Figure 6:
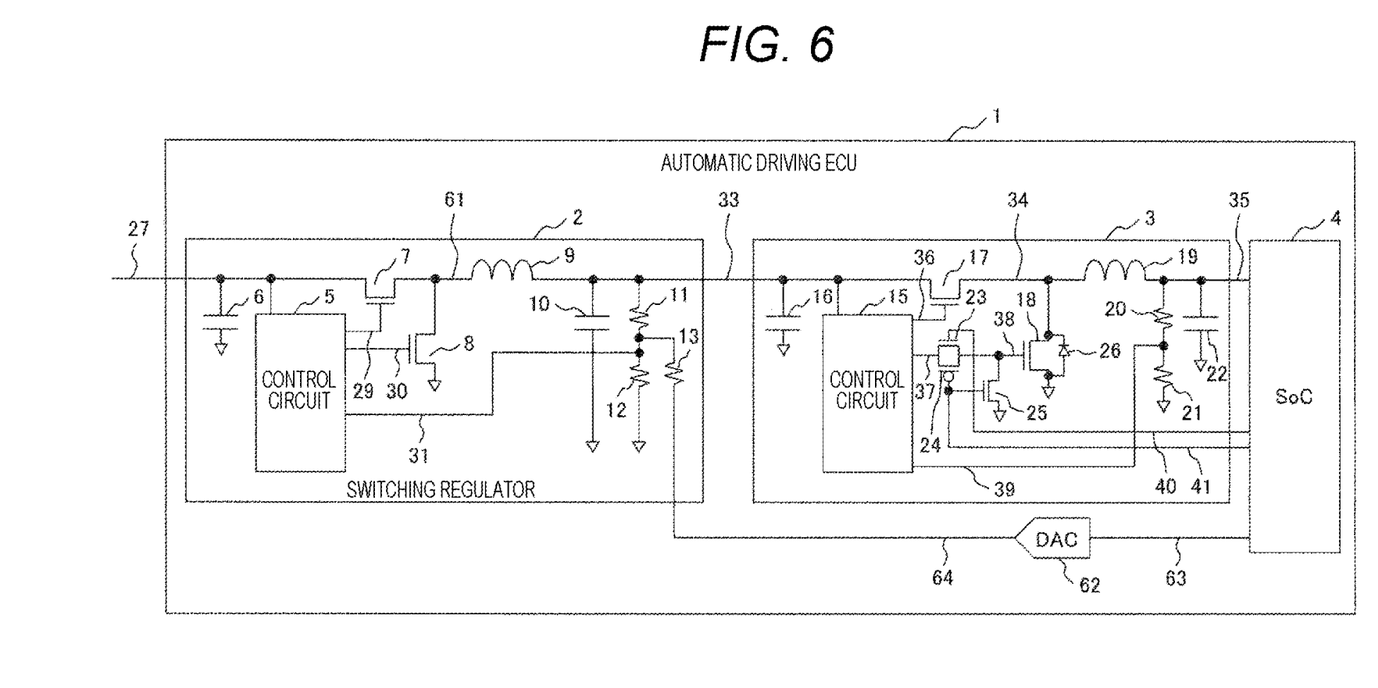
FIG. 6 is a block diagram illustrating a schematic configuration of an automatic driving ECU of a third embodiment.

An electronic control unit of a third embodiment of the present invention and a control method thereof will be described with reference to FIGS. 6 and 7. FIG. 6 is a block diagram illustrating a schematic configuration of an automatic driving ECU of the present embodiment. The electronic control unit of the present embodiment is different from the electronic control unit of the first embodiment in terms of a method of changing an output voltage of a first-stage step-down switching power supply 2. The other configurations are the same as those of the first embodiment.

In the first embodiment, the output of the first-stage step-down switching power supply 2 is switched by two values by switching ON and OFF of the switch 14 for switching an output voltage dividing resistance ratio. However, if a change in the output voltage of the first-stage step-down switching power supply 2 changes abruptly, a voltage variation is likely to occur in the output of the second-stage step-down switching power supply 3.

Therefore, in the present embodiment, a voltage of a feedback signal 31 is controlled by controlling a voltage applied to a resistor 13 for changing an output voltage dividing resistance ratio by a DAC (D/A converter) 62 as illustrated in FIG. 6. The DAC (D/A converter) 62 is a circuit or an integrated circuit (IC) that converts a digital signal into an analog signal.

An output voltage of the DAC 62 is controlled by a control signal 63 from an SoC 4. Incidentally, FIG. 6 illustrates one control signal 63 briefly, but generally inter-integrated circuit (I2C) communication) or serial peripheral interface (SPI) communication may be used.

Figure 7:
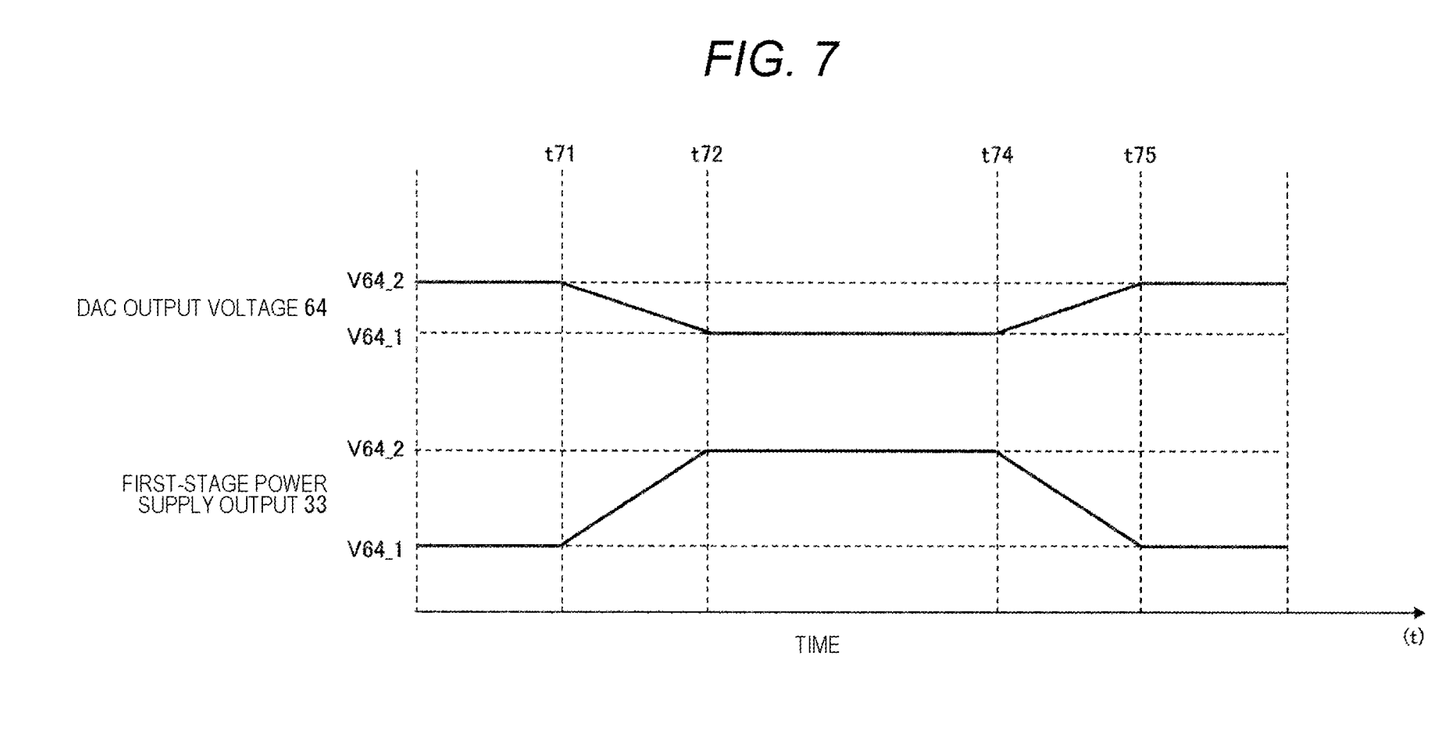
FIG. 7 is a diagram illustrating a relationship between a change of a DAC output voltage and a voltage change of a first-stage power supply output.

FIG. 7 illustrates a relationship between a change in a DAC output voltage 64 and a voltage change in a first-stage power supply output (output voltage) 33 of the first-stage step-down switching power supply 2. When a voltage value of the DAC output voltage 64 decreases, a voltage value of the first-stage power supply output (output voltage) 33 increases according to the amount of the decrease. Further, when the voltage value of the DAC output voltage 64 is increased, the voltage value of the first-stage power supply output (output voltage) 33 decreases according to the amount of the increase.

As described above, the electronic control unit (an automatic driving ECU 1) according to the present embodiment includes the DAC (D/A converter) 62 whose output voltage can be controlled by a calculation unit (the SoC 4), and the resistor 13 for changing an output voltage dividing resistance ratio that connects the output of the DAC 62 and the feedback signal line 31 of a second power supply circuit (the first-stage step-down switching power supply 2), and changes a second power supply voltage (the first-stage power supply output 33) to a desired voltage at a desired speed by changing the output of the DAC 62.

When the DAC output voltage 64 is changed for a changing time so as to have a speed that does not generate the voltage variation of the output of the second-stage step-down switching power supply 3, that is, so as to be slower than a response speed of the second-stage step-down switching power supply 3, the voltage variation of the output of the second-stage step-down switching power supply 3 due to the voltage change of the first-stage power supply output (output voltage) 33 can be suppressed.

Further, since the voltage value of the first-stage power supply output (output voltage) 33 is made variable by the DAC 62, the voltage value of the first-stage power supply output (output voltage) 33 can be selected according to a speed of a change in an increase amount of a load current, and responsiveness and power efficiency can be optimized.

Fourth Embodiment

An electronic control unit of a fourth embodiment of the present invention and a control method thereof will be described with reference to FIG. 8.

Figure 8:
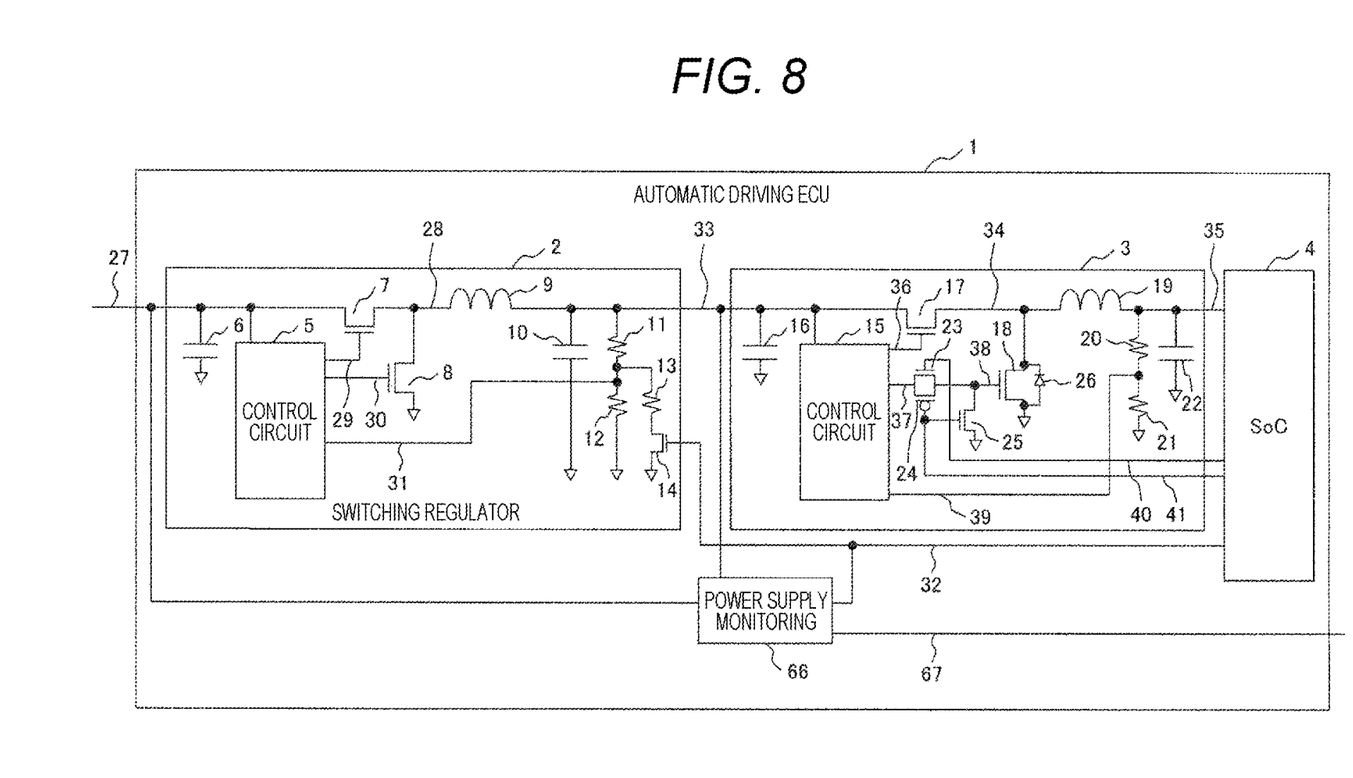
FIG. 8 is a block diagram illustrating a schematic configuration of an automatic driving ECU of a fourth embodiment.

FIG. 8 is a block diagram illustrating a schematic configuration of an automatic driving ECU of the present embodiment. In the electronic control unit of the present embodiment, a power supply monitoring circuit 66 is added to the electronic control unit of the first embodiment. The other configurations are the same as those of the first embodiment.

The power supply monitoring circuit 66 monitors whether a voltage value of a first-stage power supply output (output voltage) 33 falls within a normal operation range. The power supply monitoring circuit 66 operates with power supplied from a power supply line 27.

Further, to the power supply monitoring circuit 66, a control signal 32, configured for an SoC 4 to switch the voltage value of the first-stage power supply output (output voltage) 33, is input as a control signal, and the first-stage power supply output (output voltage) 33 is input for monitoring.

Further, the power supply monitoring circuit 66 outputs a notification signal 67 to the outside when detecting an abnormality of the first-stage power supply output (output voltage) 33.

As described above, the electronic control unit (an automatic driving ECU 1) of the present embodiment includes the power supply monitoring circuit 66 that monitors a voltage value of a second power supply voltage (the first-stage power supply output 33). When detecting that the voltage value of the second power supply voltage (first-stage power supply output 33) is out of a predetermined range, the power supply monitoring circuit 66 outputs the notification signal 67 notifying that the abnormality has been detected, and changes a voltage range to be detected as abnormal according to a control signal.

The first-stage power supply output (output voltage) 33 is likely to be out of the normal operation range and determined as abnormal if being increased when a load current increases. Thus, the power supply monitoring circuit 66 has a function of changing a voltage value to be determined as abnormal according to a value of the control signal 32.

Incidentally, the present invention is not limited to the above-described embodiments, but includes various modifications.

For example, the above-described embodiments have been described in detail in order to describe the present invention in an easily understandable manner, and are not necessarily limited to those including the entire configuration that has been described above. Further, some configurations of a certain embodiment can be substituted by configurations of another embodiment, and further, a configuration of another embodiment can be also added to a configuration of a certain embodiment. Further, addition, deletion, or substitution of other configurations can be made with respect to some configurations of each of the embodiments.

REFERENCE SIGNS LIST 1 automatic driving ECU
2 first-stage step-down switching power supply (switching regulator)
3 second-stage step-down switching power supply
4 SoC
5, 15 (power supply) control circuit
6, 10, 16, 22 capacitor
7, 8, 17, 18 power switch
9, 19 inductor
11, 12, 20, 21 output voltage dividing resistor
13 resistor (for changing output voltage dividing resistance ratio)
14 switch (for switching output voltage dividing resistance ratio)
23, 24, 25 switch
26, 56 (parasitic) diode
27 power supply line
31 feedback signal (line)
32, 40, 41, 63 control signal
33 power supply line (first-stage power supply output)
34 node
35 power supply output
37 output signal
38 gate signal
42 camera
43 radar
44 Lidar
45 steering control ECU
46 brake control ECU
47 engine control ECU
48, 49, 50, 51, 52, 53 communication I/F
54 NMOS
55 resistor (for limiting current)
57, 58, 59 diode
60 battery
62 DAC (D/A converter)
64 DAC output voltage
66 power supply monitoring circuit
67 notification signal.

The invention claimed is:

1. An electronic control unit comprising:
a calculation unit that performs signal processing;
a first power supply circuit that supplies a first power supply voltage to the calculation unit; and
a second power supply circuit that supplies a second power supply voltage to the first power supply circuit,
wherein the calculation unit has a function of expecting a change in a consumed current of the calculation unit and outputting a control signal when the change in the consumed current exceeds a predetermined threshold, and changes any voltage value of a control scheme of the first power supply circuit and the second power supply voltage according to the control signal.

2. The electronic control unit according to claim 1, wherein
the second power supply circuit has a function of changing a voltage value of the second power supply voltage according to the control signal, and
the calculation unit increases the voltage value of the second power supply voltage when the change in the consumed current of the calculation unit exceeds the predetermined threshold.

3. The electronic control unit according to claim 1, wherein
the first power supply circuit
is a step-down switching power supply circuit that includes:
an inductor;
a high-side switch that switches ON and OFF between the inductor and an input power supply;
a low-side switch that switches ON and OFF between an input of the inductor and a GND; and
a control circuit that controls ON and OFF of the high-side switch and the low-side switch,
has a function of constantly controlling the low-side switch to an OFF state according to the control signal, and
constantly controls the low-side switch to the OFF state when being notified that the change in the consumed current of the calculation unit exceeds the predetermined threshold according to the control signal.

4. The electronic control unit according to claim 3, further comprising:
a switch arranged between a substrate terminal of the low-side switch and the GND; and
a plurality of diodes connected in series between a node connecting the high-side switch and the inductor, and the GND,
wherein the low-side switch is an NMOS, and
the switch is also controlled to the OFF state simultaneously as the low-side switch is controlled to the OFF state, the substrate terminal of the low-side switch and the GND are brought into a disconnected state, and a current flowing through the inductor is supplied from the GND through the plurality of diodes when the high-side switch is in the OFF state.

5. The electronic control unit according to claim 1, further comprising:
a DAC (D/A converter) whose output voltage is controllable by the calculation unit; and
a resistor that connects an output of the DAC and a feedback signal line of the second power supply circuit,
wherein the output of the DAC is changed to change the second power supply voltage to a desired voltage at a desired speed.

6. The electronic control unit according to claim 1, further comprising
a power supply monitoring circuit that monitors a voltage value of the second power supply voltage,
wherein the power supply monitoring circuit outputs a notification signal for notifying that an abnormality has been detected when detecting that the voltage value of the second power supply voltage is out of a predetermined range, and changes a voltage range to be detected as abnormal according to the control signal.

7. The electronic control unit according to claim 1, wherein
the calculation unit
performs calculation for grasping an object around a vehicle and controlling the vehicle based on information of an external recognition sensor,
predicts a change in a calculation amount caused by a difference in a type of the calculation or a driving condition, and
outputs the control signal to an outside when a change in a consumed current due to the change in the calculation amount exceeds a predetermined threshold.

* * * * *